United States Patent
Pourfallah et al.

(10) Patent No.: US 11,443,314 B2
(45) Date of Patent: *Sep. 13, 2022

(54) DATA SECURITY SYSTEM USING MOBILE COMMUNICATIONS DEVICE

(71) Applicant: Visa International Service Association, San Francisco, CA (US)

(72) Inventors: Stacy Pourfallah, San Ramon, CA (US); Jessica Yang, Foster City, CA (US); Shilpak Mahadkar, Oakland, CA (US)

(73) Assignee: Visa International Service Association, San Francisco, CA (US)

(*) Notice: Subject to any disclaimer, the term of this patent is extended or adjusted under 35 U.S.C. 154(b) by 286 days.

This patent is subject to a terminal disclaimer.

(21) Appl. No.: 16/664,386

(22) Filed: Oct. 25, 2019

(65) Prior Publication Data
US 2020/0058028 A1 Feb. 20, 2020

Related U.S. Application Data

(63) Continuation of application No. 14/379,478, filed as application No. PCT/US2013/027481 on Feb. 22, 2013, now Pat. No. 10,496,990.
(Continued)

(51) Int. Cl.
*G06Q 20/40* (2012.01)
*G06Q 20/10* (2012.01)
(Continued)

(52) U.S. Cl.
CPC ......... *G06Q 20/4012* (2013.01); *G06Q 20/10* (2013.01); *G06Q 20/1085* (2013.01);
(Continued)

(58) Field of Classification Search
CPC .... G06Q 20/4012; G06Q 40/02; G06Q 20/10; G06Q 20/425; G06Q 20/32;
(Continued)

(56) References Cited

U.S. PATENT DOCUMENTS 5,530,438 A 6/1996 Bickham et al.
5,615,110 A 3/1997 Wong
(Continued)

FOREIGN PATENT DOCUMENTS

AU 2003201332 B2 6/2004
AU 2005279689 B2 4/2008
(Continued)

OTHER PUBLICATIONS

"Secure Internet banking authentication"; A. Hiltgen • T. Kramp • T. Weigold; IEEE Security & Privacy (vol. 4, Issue: 2, pp. 21-29); (Year: 2008).*
(Continued)

*Primary Examiner* — John W Hayes
*Assistant Examiner* — Edgar R Martinez-Hernandez
(74) *Attorney, Agent, or Firm* — Kilpatrick Townsend & Stockton LLP

(57) ABSTRACT

Embodiments of the invention provide systems and methods to unlock an account associated with a user for a limited period of time to enable the user conduct a transaction using funds from that account. In one embodiment of the invention, the user may select options relating to the transaction using a payment menu provided at a mobile communications device associated with the user. A notification message is received at the mobile communications device informing the user that the account is unlocked for a certain period of time and for a certain amount. After the transaction is complete, the user is notified and the account is locked again.

20 Claims, 12 Drawing Sheets

Related U.S. Application Data

(60) Provisional application No. 61/601,935, filed on Feb. 22, 2012.

(51) Int. Cl.

| | | |
|---|---|---|
| *G06Q 20/42* | (2012.01) | |
| *H04L 9/40* | (2022.01) | |
| *G06Q 40/02* | (2012.01) | |
| *H04W 12/61* | (2021.01) | |
| *G06Q 20/32* | (2012.01) | |
| *H04W 12/06* | (2021.01) | |

(52) U.S. Cl.
CPC ....... *G06Q 20/3221* (2013.01); *G06Q 20/425* (2013.01); *G06Q 40/02* (2013.01); *H04L 63/083* (2013.01); *H04L 63/108* (2013.01); *H04W 12/61* (2021.01); *H04W 12/06* (2013.01)

(58) Field of Classification Search
CPC .......... G06Q 20/1085; G06Q 20/3221; H04W 12/61; H04W 12/06; H04L 63/108; H04L 63/083
See application file for complete search history.

(56) References Cited

U.S. PATENT DOCUMENTS

| | | | |
|---|---|---|---|
| 5,878,337 A | 3/1999 | Joao et al. | |
| 5,883,810 A | 3/1999 | Franklin et al. | |
| 5,903,830 A | 5/1999 | Joao et al. | |
| 5,953,710 A | 9/1999 | Fleming | |
| 5,954,793 A | 9/1999 | Stutman et al. | |
| 5,991,749 A | 11/1999 | Morrill, Jr. | |
| 6,044,360 A | 3/2000 | Picciallo | |
| 6,064,990 A | 5/2000 | Goldsmith | |
| 6,273,335 B1 | 8/2001 | Sloan | |
| 6,327,578 B1* | 12/2001 | Linehan ................ G06Q 20/02 | |
| | | | 713/172 |
| 6,422,462 B1 | 7/2002 | Cohen | |
| 6,529,725 B1 | 3/2003 | Joao et al. | |
| 6,535,855 B1 | 3/2003 | Cahill et al. | |
| 6,879,965 B2 | 4/2005 | Fung et al. | |
| 6,891,811 B1 | 5/2005 | Smith et al. | |
| 7,089,022 B1* | 8/2006 | Kaplan ................... H04W 4/02 | |
| | | | 455/456.3 |
| 7,089,208 B1 | 8/2006 | Levchin et al. | |
| 7,096,003 B2 | 8/2006 | Joao et al. | |
| RE39,736 E | 7/2007 | Morrill, Jr. | |
| 7,264,154 B2 | 9/2007 | Harris | |
| 7,343,149 B2 | 3/2008 | Benco et al. | |
| 7,355,990 B2 | 4/2008 | Smith et al. | |
| 7,357,310 B2 | 4/2008 | Calabrese et al. | |
| 7,685,037 B2 | 3/2010 | Reiners et al. | |
| 7,702,578 B2 | 4/2010 | Fung et al. | |
| 7,707,120 B2 | 4/2010 | Dominguez et al. | |
| 7,712,655 B2 | 5/2010 | Wong | |
| 7,742,984 B2 | 6/2010 | Mohsenzadeh | |
| 7,753,265 B2 | 7/2010 | Harris | |
| 7,865,414 B2 | 1/2011 | Fung et al. | |
| 7,945,240 B1 | 5/2011 | Klock et al. | |
| 7,954,706 B2 | 6/2011 | Calabrese et al. | |
| 8,074,879 B2 | 12/2011 | Harris | |
| 8,145,566 B1 | 3/2012 | Ahuja et al. | |
| 8,170,527 B2 | 5/2012 | Granucci et al. | |
| 8,346,659 B1 | 1/2013 | Mohsenzadeh | |
| 8,352,362 B2 | 1/2013 | Mohsenzadeh | |
| 8,370,265 B2* | 2/2013 | Coulter ................ G06Q 20/108 | |
| | | | 380/247 |
| 8,401,963 B2 | 3/2013 | Mohsenzadeh et al. | |
| RE44,467 E | 8/2013 | Morrill, Jr. et al. | |
| 8,543,497 B1 | 9/2013 | Mohsenzadeh | |
| 9,367,834 B2 | 6/2016 | Morgan et al. | |
| 9,552,573 B2 | 1/2017 | Kulpati et al. | |
| 10,496,990 B2* | 12/2019 | Pourfallah ............ H04L 63/108 | |
| 2002/0052754 A1 | 5/2002 | Joyce et al. | |
| 2002/0129264 A1 | 9/2002 | Rowland et al. | |
| 2003/0187788 A1 | 10/2003 | Rothfarb | |
| 2004/0078325 A1 | 4/2004 | O'Connor | |
| 2004/0172368 A1* | 9/2004 | Johnson ................ G06Q 20/02 | |
| | | | 705/64 |
| 2005/0246289 A1 | 11/2005 | Alexander et al. | |
| 2005/0263588 A1 | 12/2005 | Babi et al. | |
| 2006/0015743 A1 | 1/2006 | Camaisa et al. | |
| 2006/0261152 A1 | 11/2006 | Wong | |
| 2007/0045403 A1* | 3/2007 | Slonecker ............ G06Q 20/354 | |
| | | | 235/380 |
| 2007/0198432 A1 | 8/2007 | Pitroda et al. | |
| 2007/0233615 A1* | 10/2007 | Tumminaro .......... G06Q 20/32 | |
| | | | 705/75 |
| 2007/0266257 A1 | 11/2007 | Camaisa et al. | |
| 2007/0288363 A1* | 12/2007 | Gerard ................... G06Q 20/04 | |
| | | | 705/39 |
| 2008/0020144 A1 | 1/2008 | Poletek et al. | |
| 2008/0086759 A1 | 4/2008 | Colson | |
| 2008/0189773 A1 | 8/2008 | Maiorano et al. | |
| 2008/0235136 A1 | 9/2008 | Kemper et al. | |
| 2008/0250477 A1 | 10/2008 | Samuelsson et al. | |
| 2010/0051686 A1 | 3/2010 | Obi et al. | |
| 2010/0057619 A1 | 3/2010 | Weller et al. | |
| 2010/0198728 A1 | 8/2010 | Aabye et al. | |
| 2010/0223145 A1 | 9/2010 | Dragt | |
| 2010/0274691 A1 | 10/2010 | Hammad et al. | |
| 2010/0325047 A1 | 12/2010 | Carlson et al. | |
| 2011/0016049 A1 | 1/2011 | Kilfoil | |
| 2011/0055077 A1 | 3/2011 | French et al. | |
| 2011/0078021 A1 | 3/2011 | Tullis | |
| 2011/0078025 A1* | 3/2011 | Shrivastav ............ G06Q 20/20 | |
| | | | 705/14.64 |
| 2011/0098030 A1 | 4/2011 | Luoma | |
| 2011/0099108 A1 | 4/2011 | Fung et al. | |
| 2011/0106702 A1 | 5/2011 | Fung et al. | |
| 2012/0003957 A1 | 1/2012 | Agevik et al. | |
| 2012/0024946 A1 | 2/2012 | Tullis et al. | |
| 2012/0028609 A1 | 2/2012 | Hruska | |
| 2012/0066034 A1 | 3/2012 | Nolan | |
| 2012/0077461 A1 | 3/2012 | Das et al. | |
| 2012/0095911 A1* | 4/2012 | Ibasco ................... G06Q 20/367 | |
| | | | 705/39 |
| 2012/0310824 A1 | 12/2012 | Liberty | |
| 2012/0317025 A1 | 12/2012 | Wong | |
| 2013/0086684 A1 | 4/2013 | Mohler | |
| 2013/0139222 A1 | 5/2013 | Kirillin et al. | |
| 2013/0160104 A1 | 6/2013 | Carlson | |
| 2013/0191290 A1 | 7/2013 | Glendenning | |

FOREIGN PATENT DOCUMENTS

| | | |
|---|---|---|
| KR | 10-2010-0032876 A | 3/2010 |
| WO | 2008/024870 | 2/2008 |
| WO | 2011/051549 | 5/2011 |
| WO | 2012/027694 A2 | 3/2012 |
| WO | 2013/090797 | 6/2013 |

OTHER PUBLICATIONS

"Wireless wallet"; Y. Labrou • J. Agre • L. Ji • J. Molina • W. Chen; The First Annual International Conference on Mobile and Ubiquitous Systems: Networking and Services, 2004. Mobiquitous 2004. (pp. 32-41); (Year: 2004).*

"The Security Requirement for off-line E-cash system based on IC Card"; Haeryong Park • Kilsoo Chun • Seungho Ahn; 11th International Conference on Parallel and Distributed Systems (ICPADS'05) (vol. 2, pp. 260-264); (Year: 2005).*

Notice of Allowance dated Dec. 3, 2015 for U.S. Appl. No. 13/714,995, 17 pages.

U.S. Appl. No. 61/428,144, Management of Prefunded Accounts:, Dec. 29, 2010, 26 pages.

Chin et al., "Sim Card Based E-Cash Applications in the Mobile Communication System Using Ota and Stk Technology", Wireless,

(56) References Cited

OTHER PUBLICATIONS

Mobile and Multimedia Networks, IET International Conference, Nov. 6-9, 2006, pp. 1-3.
Fang et al., "Online Banking Authentication Using Mobile Phones", Future Information Technology (FutureTech), 5th International Conference, May 21-23, 2010, 5 pages.
Harb et al., "SecureSMSPay: Secure SMS Mobile Payment model", Anti-counterfeiting, Security and Identification, 2nd International Conference, Aug. 20-23, 2008, pp. 11-17.
Harun-Ar-Rashid , "Independent Channel Multi Method Multi-Factor Authentication (MMM-FA) Model for B2P Remote Commerce", 10th IEEE International Enterprise Distributed Object Computing Conference Workshops (EDOCW'06), 2006.
Hornyack et al., "These Aren't the Droids You're Looking for", Computer and Communications Security, ACM, 2, Oct. 17, 2011, pp. 639-651.
Neuman , "Security, Payment, and Privacy for Network Commerce", IEEE Journal on Selected Areas in Communications, vol. 12, No. 8, Oct. 1995, pp. 1523-1531.
International Search Report and Written opinion dated Jun. 21, 2013 for International Application No. PCT/US2013/027481, 11 pages.

\* cited by examiner

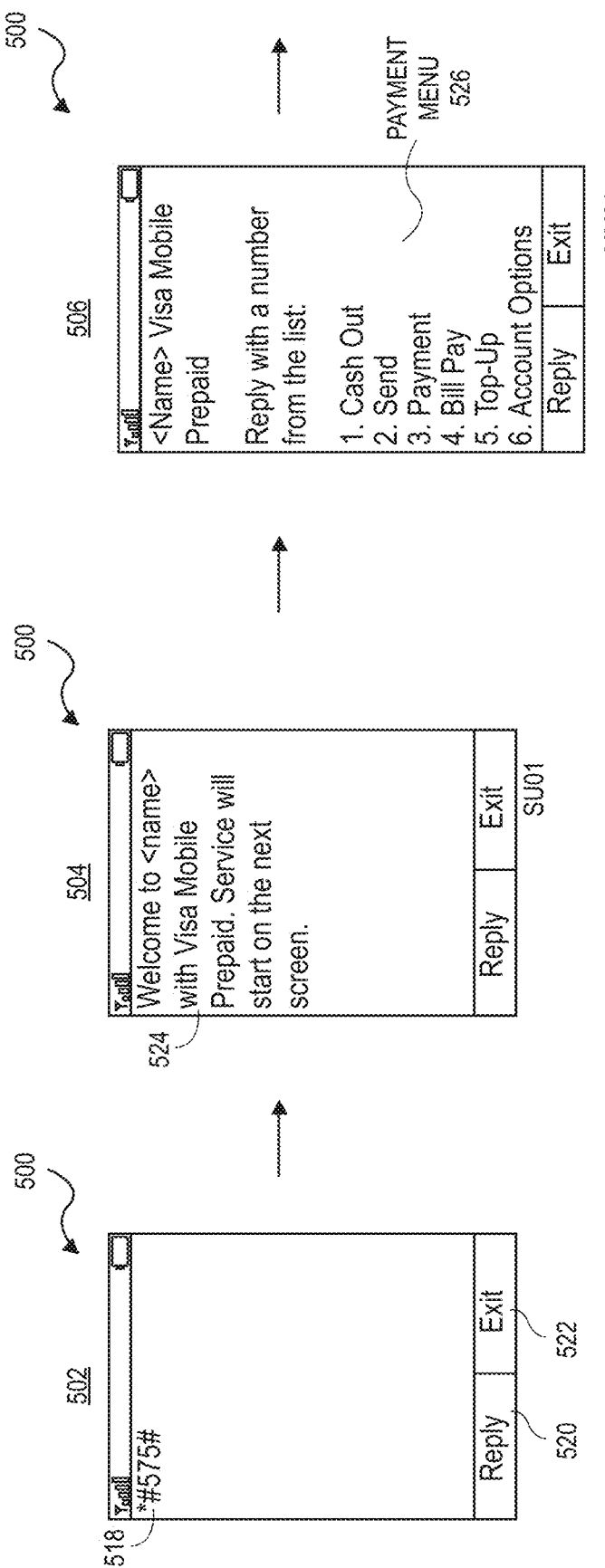

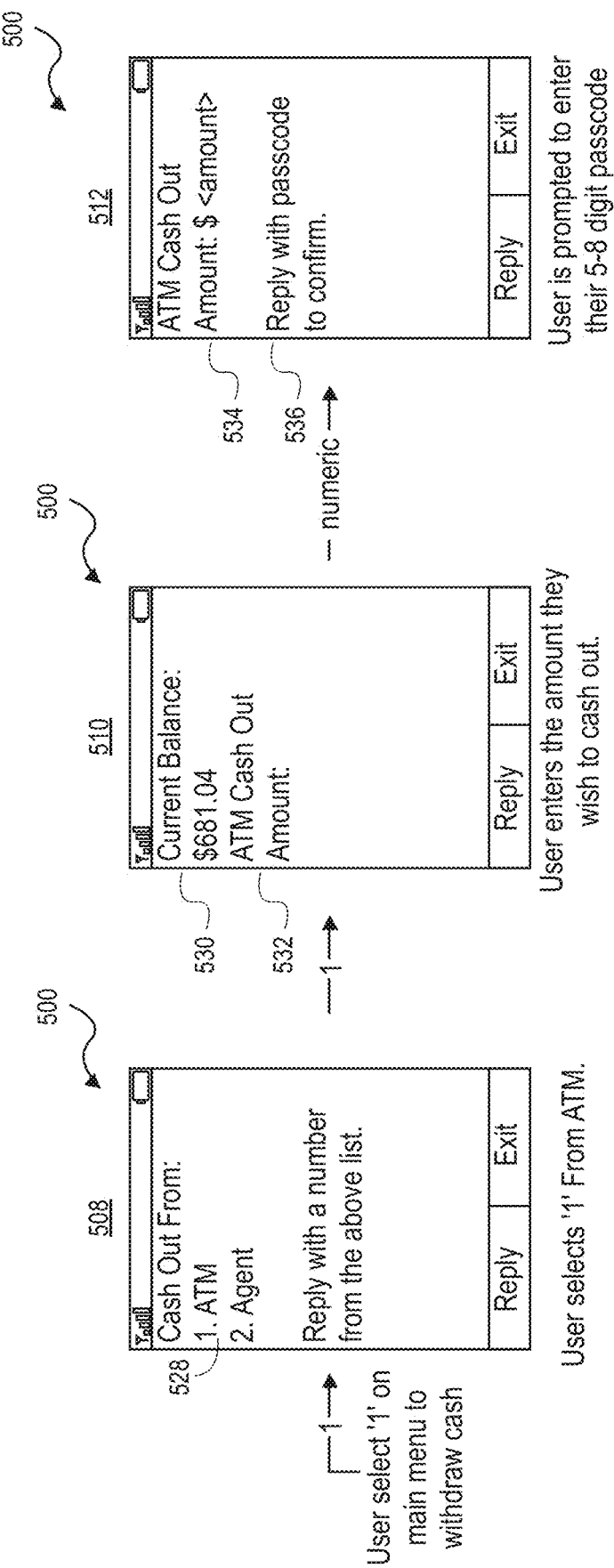

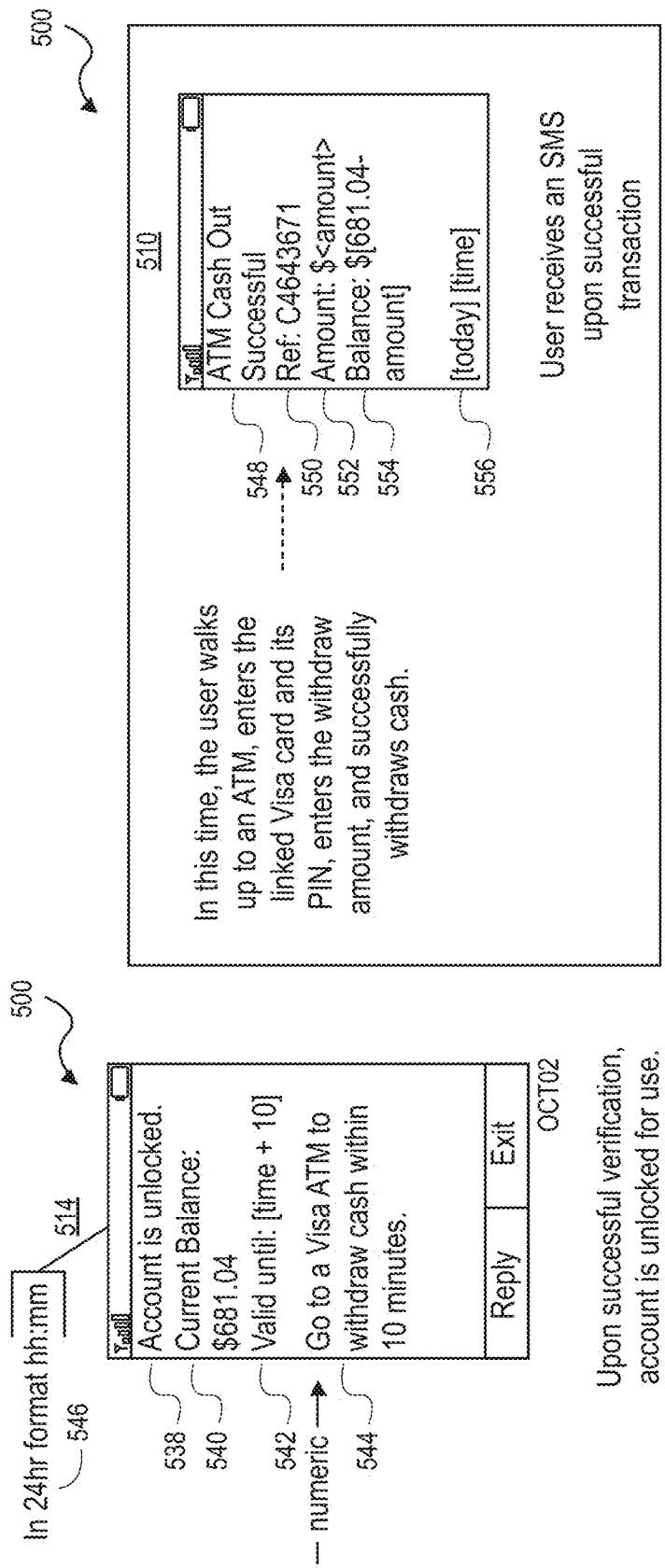

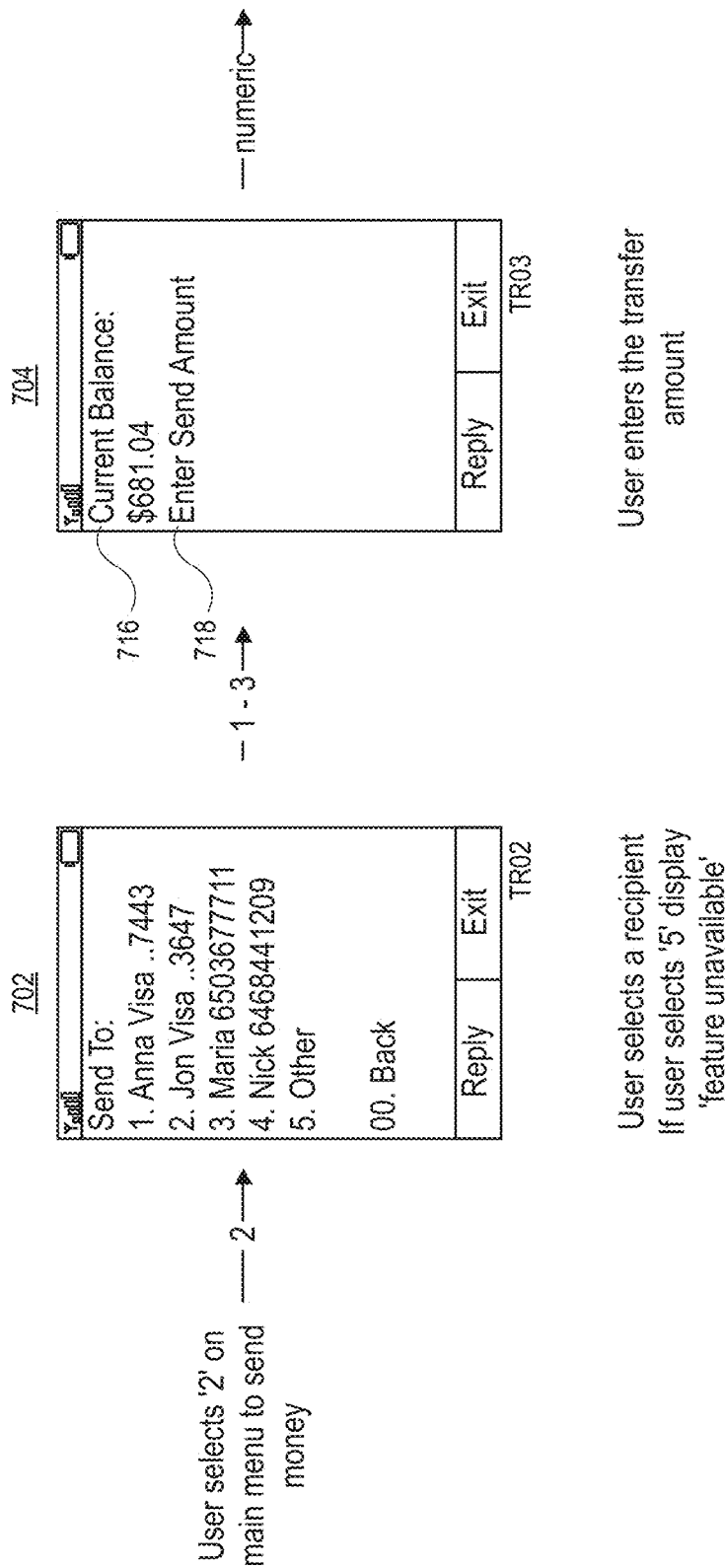

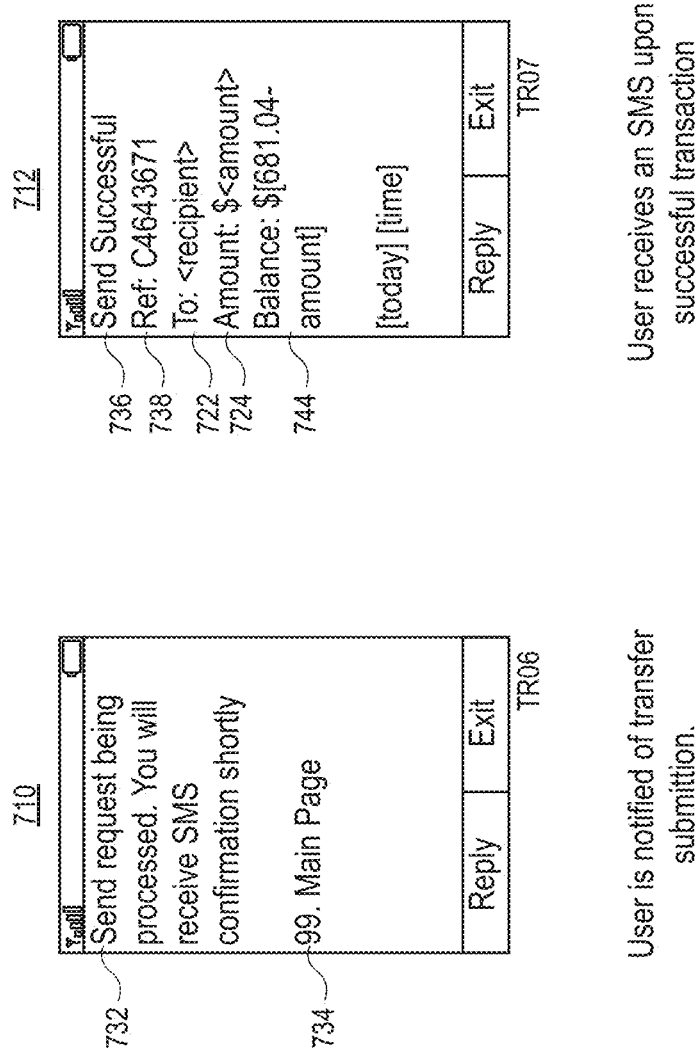

DATA SECURITY SYSTEM USING MOBILE COMMUNICATIONS DEVICE

CROSS-REFERENCES TO RELATED APPLICATIONS

This application is a Continuation of U.S. application Ser. No. 14/379,478, filed on Aug. 18, 2014, which is a 371 National Stage Entry of Patent Cooperation Treaty Application No. PCT/US2013/027481, filed on Feb. 22, 2013, which claims benefit of priority of U.S. Provisional Application No. 61/601,935, filed on Feb. 22, 2012, which are herein incorporated by reference in their entirety for all purposes.

BACKGROUND

Embodiments of the invention relate to systems and method for improving the data security associated with financial transactions.

Financial institutions and other organizations are continuing to address problems relating to fraud in financial transactions. Examples of such transactions include merchant payment transactions, cash withdrawal and/or cash advances transactions, and person-to-person money transfer transactions. Fraudulent activities involving unauthorized access to financial accounts in most cases result in financial losses and unproductive use of resources (human and computing resources) for consumers, merchants and the financial institutions. Conventional data security methods can utilize a number of steps and can utilize complex systems, however, fraudsters and hackers are still able to break the system and perform unwanted actions, if they get unauthorized access to a financial account number or a payment card.

Embodiments of the invention provide for improve methods for improving data security and reduce fraudulent transactions. Embodiments of the invention address these and other problems.

BRIEF SUMMARY

Embodiments of the invention provide systems and methods for unlocking a financial account associated with an authenticated user for a user specified unlock amount for a limited period of time in order to enable the user conduct a financial transaction using funds from that account. Some non-limiting examples of the transaction include withdrawing cash, sending money to a recipient, topping up an account, making payments, etc. By allowing limited access to a user's account, embodiments of the invention provide benefits, such as, reduction in fraudulent transactions and improved account security. A mobile payment application, in accordance with an embodiment of the invention, provides a convenient and easy user interface for conducting transactions in a secure manner.

One embodiment of the invention is directed to a method comprising sending to a server computer by a mobile communications device a request message to unlock an account associated with a user for conducting a transaction, providing to the server computer a passcode and an unlock amount specified by the user, receiving from the server computer a notification message at the mobile communications device that the account associated with the user is unlocked for a limited period of time if the passcode is verified, and generating by the mobile communications device an output message comprising the notification message.

Another embodiment of the invention is directed to a server computer comprising a processor and a non-transitory computer readable storage medium, comprising code executable by the processor for implementing a method comprising sending to a server computer a request message to unlock an account associated with a user for conducting a transaction, providing to the server computer a passcode specified and an unlock amount by the user, receiving from the server computer a notification message that the account associated with the user is unlocked for a limited period of time if the passcode is verified, and generating an output message comprising the notification message.

Another embodiment of the invention is directed to a method of receiving at a server computer from a mobile communications device, a request message to unlock an account associated with a user for conducting a transaction associated with the account, transmitting by the server computer to the mobile communications device a request for a passcode and an unlock amount, verifying by the server computer the passcode based on account information associated with the user stored in a database communicatively coupled to the server computer, and unlocking the account for a limited period of time to allow conducting the transaction using the account if the passcode is verified.

Another embodiment of the invention is directed to a server computer comprising a processor and a non-transitory computer readable storage medium, comprising code executable by the processor for implementing a method comprising receiving from a mobile communications device, a request message to unlock an account associated with a user for conducting a transaction associated with the account, transmitting to the mobile communications device a request for a passcode and an unlock amount, verifying the passcode based on account information associated with the user stored in a database communicatively coupled to the server computer, and unlocking the account for a limited period of time to allow conducting the transaction using the account if the passcode is verified.

These and other embodiments of the invention are described in further detail below with reference to the Figures and the Detailed Description.

BRIEF DESCRIPTION OF THE DRAWINGS

FIGS. 5A-5H illustrate exemplary screen shots for withdrawing cash using a mobile payment application, in one embodiment of the invention.

FIGS. 7A-7F illustrate exemplary screen shots for sending money to a recipient using a mobile payment application, in one embodiment of the invention.

DETAILED DESCRIPTION

Figure 1:
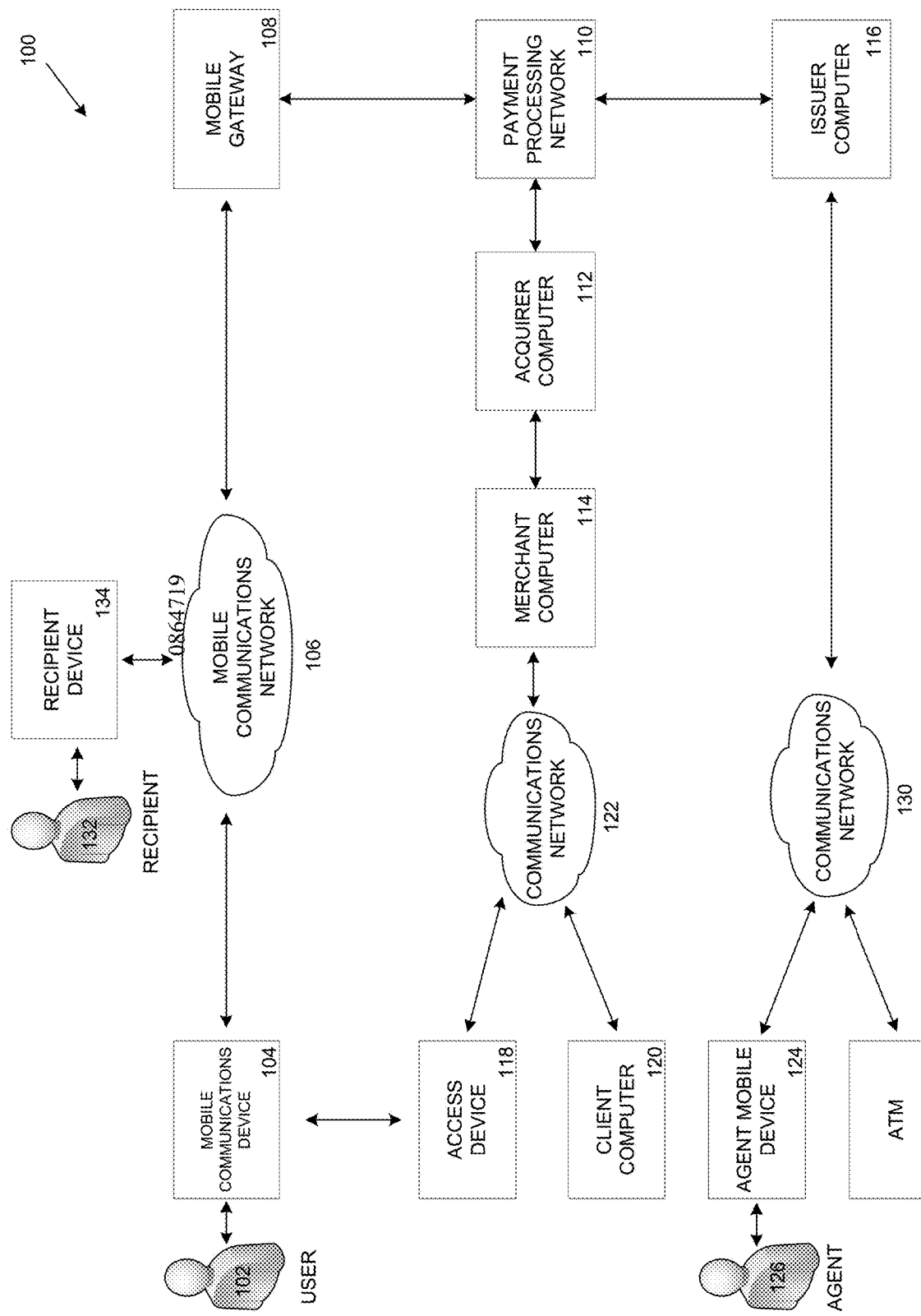
FIG. 1 illustrates certain elements of an exemplary system in which one or more embodiments of the invention may be implemented.

Prior to discussing embodiments of the invention, description of some terms may be helpful in understanding embodiments of the invention.

A "payment menu" may include a menu with options related to payment for a financial transaction. For example, the payment menu may include options for withdrawing cash from an account, transferring money to another account, making a payment for a purchase, viewing account balance, paying bills, etc. The payment menu may be displayed on a screen of a device and an option from the payment menu may be selected by a user by entering a number associated with the option on a keypad, by touching the option on the screen, by saying the number or the option or using any other suitable way of communication with the device.

A "transaction" may include exchange of data and/or information between two entities. In one embodiment, a transaction may involve a financial account for activities such as, making a purchase, money transfer, cash withdrawal from a bank account, etc. In some embodiments, a transaction may be conducted at an automatic teller machine (ATM) or at an access device (e.g., point-of-sale (POS) terminal, personal computer, device reader, etc.). The transactions may be conducted using a portable device, such as, mobile communications device (phone, tablet, PDA, RFID tag) or a payment card (credit, debit, rewards or loyalty, gift card, etc.).

A "user" may include an entity, such as, an individual, capable of conducting a transaction. In some embodiments, the user may be able to use a portable device (payment card, mobile device, etc.) to conduct a transaction online, at an ATM or at an access device. In one embodiment, the user may be able to access a payment menu on a device so that an account associated with the user may be unlocked for a limited period of time to allow the user for conducting a transaction.

A "mobile communications device" may include an electronics device capable of receiving and sending data and information wirelessly. Some non-limiting examples of a mobile communications device include mobile phones, notebooks, laptops, tablets, PDAs, netbooks, etc. In some embodiments, a mobile communications device may be associated with financial accounts of a user that may be accessed by a mobile payment application for allowing the user to initiate financial transactions using the mobile communications device. In some embodiments, a mobile communications device may be used in association with a payment card (e.g., credit card, debit card, check card, etc.) for conducting financial transactions as well as for card-not-present transactions.

A "passcode" may include a personal code that may be provided by a user for authentication. In one embodiment, the passcode is setup by the user while registering a financial account with a mobile pre-paid service. The passcode may be a combination of digits, alphabets or alphanumeric characters. In some embodiments, the passcode may be of certain minimum length and may not exceed certain maximum length, e.g., the passcode may be 5-8 digits long. In one embodiment, a server computer may authenticate a user by verifying the passcode provided by the user in order to allow the user access to a financial account associated with the user for conducting a transaction.

A "notification message" may include a message that may be communicated to a mobile communications device associated with a user. In some embodiments, the notification may include a text message, an SMS (short message service), an email, a web post, a phone call or any other suitable form of communication. In one embodiment, the notification message may indicate the user that an account associated with the user is unlocked for a certain period of time. In one embodiment, the notification message may be related to a financial transaction conducted by the user, e.g., available balance in the user's financial account.

"Unlocked" may indicate that an account is not blocked or locked, i.e., the account may be accessible for conducting a transaction, such as, withdrawing money, transferring money to another account, paying bills, making a purchase, etc. When an account is blocked or locked, the account owner may not have access to that account or may not be able to conduct transactions using that account. In some embodiments, an account may be unlocked for a limited period of time, i.e., for 10 minutes. In some embodiments, the account may be locked again after the unlocking period expires.

An "unlock amount" may include an amount for a transaction specified by a user to allow for the transfer of funds into or out of an account associated with the user. The amount can be of any suitable magnitude, and can be less than the amount of funds within an account.

In some embodiments, an account may be locked by providing logic, in a central server computer, that declines requests for authorization for transactions above the unlock amount. Authorization requests for transactions below the unlock amount are approved.

As used herein, an "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, handheld specialized readers, set-top boxes, electronic cash registers (ECRs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

In one embodiment of the invention, a mobile payment application associated with a user's mobile communications device may be utilized to unlock a financial account for conducting a transaction. The user may be able to choose a type of transaction and an amount for the transaction using a payment menu provided by the mobile payment application. In some embodiments, the user may be able to select a financial account from a list of financial accounts associated with the user for a particular type of transaction. In some embodiments, the available balance for an account may be presented to the user before making a selection for the transaction. In some embodiments, a sub-list for the type of transactions may be presented after the user selects a type of transaction.

In some embodiments, the user may be prompted to enter a passcode to authenticate the transaction as well as an unlock amount. The prompts for the passcode and the unlock amount may be part of the same user interface or may be provided on separate interfaces. If the passcode is verified, the user may receive a notification message indicating that the account is unlocked, the current balance for that account and the length of time the account will be unlocked. The user then may be able to conduct a transaction using the funds from that account for the length of time the account is unlocked. However, the amount that the user is able to transfer from the account is less then or equal to the unlock amount. If the user desires to conduct an ATM transaction, the user may walk up to an ATM and enter a card linked to that account and conduct the transaction (e.g., withdraw cash, transfer money to another account, etc.). In some embodiments, a list of closest ATMs located near the user may be presented to the user based on the location of the user's mobile communications device. After the transaction is complete, the user may receive a notification message (e.g., an SMS) on the user's mobile communications device and the current balance. The user account may be locked again after the length of time is expired or the transaction is complete. The user may need to trigger the mobile payment application again for unlocking that account or another account to initiate another transaction.

FIG. 1 illustrates certain elements of an exemplary system in which one or more embodiments of the invention may be implemented.

A user 102 may utilize a mobile communications device 104 to conduct transactions at an access device 118, a client computer 120, an agent mobile device 124 associated with an agent 126 or at an ATM 128. The mobile communications device 104 may be a mobile phone, tablet, PDA, netbook, laptop, etc. In some embodiments, the mobile communications device 104 may be linked to a payment card (credit card, debit card, check card, prepaid card, etc.) associated with the user 102 for conducting financial transactions. In some embodiments, the user 102 may have one or more accounts numbers or payment tokens associated with the mobile communications device 104 (e.g., in a contactless chip or card) such that the user 102 may conduct a transaction with a device reader or an access device using a near field communications (NFC) capability, such as, RF, infrared or optical communications mechanism.

The mobile communications device 104 may be communicatively coupled to a mobile gateway 108 via a mobile communications network 106. The mobile gateway 108 may be operably coupled to the mobile communications network 106 (e.g., a wireless cellular network) to a second network (such as Internet) coupled to a payment processing network 110. The mobile gateway 108 may be configured to perform data processing operations by taking into consideration differences in network protocols between the two networks for transfer of data and information.

The payment processing network 110 may include data processing subsystems, networks, and operations used to support and deliver authorization services, and clearing and settlement services. An example of payment processing network 110 includes VisaNet®, operated by Visa®. The payment processing network 110 may include wired or wireless network, including the internet. An acquirer computer 112 is typically a system for an entity (e.g., a bank) that has a business relationship with a particular merchant or other entity. Acquirer computer 112 may route an authorization request for a transaction initiated by the mobile communications device 104 at the merchant computer 114 to the issuer computer 116 via the payment processing network 110.

The issuer computer 116 is typically a computer run by a business entity (e.g., a bank) that may have issued the payment (credit/debit) card, account numbers or payment tokens used for the purchase. Some systems can perform both issuer computer 116 and acquirer computer 112 functions. In some embodiments, an account associated with the user 102 may need to be unlocked so that the user 102 may have access to the funds associated with the account for conducting a transaction. When a transaction is initiated by the user 102 using a payment account associated with the issuer computer 116, the issuer computer 116 verifies the user's account and responds with an authorization response message to the acquirer computer 112 that may be forwarded to the mobile communications device 104. If the authorization is approved, the transaction may be completed and a notification message may be sent to the user 102 on the mobile communications device 104.

In other embodiments of the invention, the issuer computer 116, acquirer computer 112, and the payment processing network 110 may be embodied by a single payment processing system.

In some embodiments, the user 102 may initiate a purchase transaction using the access device 118 or the client computer 120. The access device 118 may be a point-of-sale (POS) terminal, a phone, a device reader, a computer or any such device capable of conducting a transaction. The client computer 120 may be a personal computer that may be used for card-not-present (CNP) transactions. The access device 118 and the client computer 120 may be communicatively coupled to a merchant computer 114 via a communications network 122. The communications network 122 may be based on Internet Protocol (IP) technology (e.g., secure socket layers (SSL), hypertext transfer protocol secure (HTTPS), etc.), dial-up modem phone line or any other suitable communications network capable of performing secure exchange of data and information.

In some embodiments, the user 102 may conduct a cash withdrawal transaction at the ATM 128 or at the agent 126. The agent mobile device 124 associated with the agent 126 and the ATM 128 may be communicatively coupled to an issuer computer (or a financial institution) 116 via a communications network 130. The agent mobile device 124 may be a mobile phone, laptop, tablet, PDA, netbook or any such electronic device capable of executing the cash withdrawal transaction. The communications network 130 may be based on IP technology, dial-up modem or any other suitable communications network capable of performing secure exchange of data and information. In some embodiments, the communications network 130 may include gateways or other networks for providing proper communication between the issuer computer 116 and the ATM 128 or the agent mobile device 124.

In some embodiments, the user 102 may also send money or perform a money transfer process with respect to a recipient 132. The recipient may operate a recipient mobile device 134. Once the money is transferred to an account associated with the recipient 132, or once the transaction is otherwise authorized, the payment processing network 110 may send a notification message to the recipient mobile device 134 via the mobile communications network 106 informing of the transaction.

In one embodiment of the invention, Unstructured Supplementary Service Data (USSD) capabilities may be utilized to implement real-time sessions between the mobile communications device 104 and a USSD application platform that may be hosted on a server computer. In one embodiment of the invention, the server computer may be part of the payment processing network 110. The user 102 may invoke the USSD service by entering a shortcode on the mobile communications device 104, thus allowing the data transfer between the mobile communications device 104 and the USSD application platform until the service is complete. In one embodiment, the user 102 may enter a shortcode to launch a payment menu associated with a mobile payment application based on the USSD service. The mobile payment application may enable the user to perform financial transactions, such as, payments, money transfer, top-up, bill payments, cash withdrawal, etc. using the payment menu.

Figure 2:
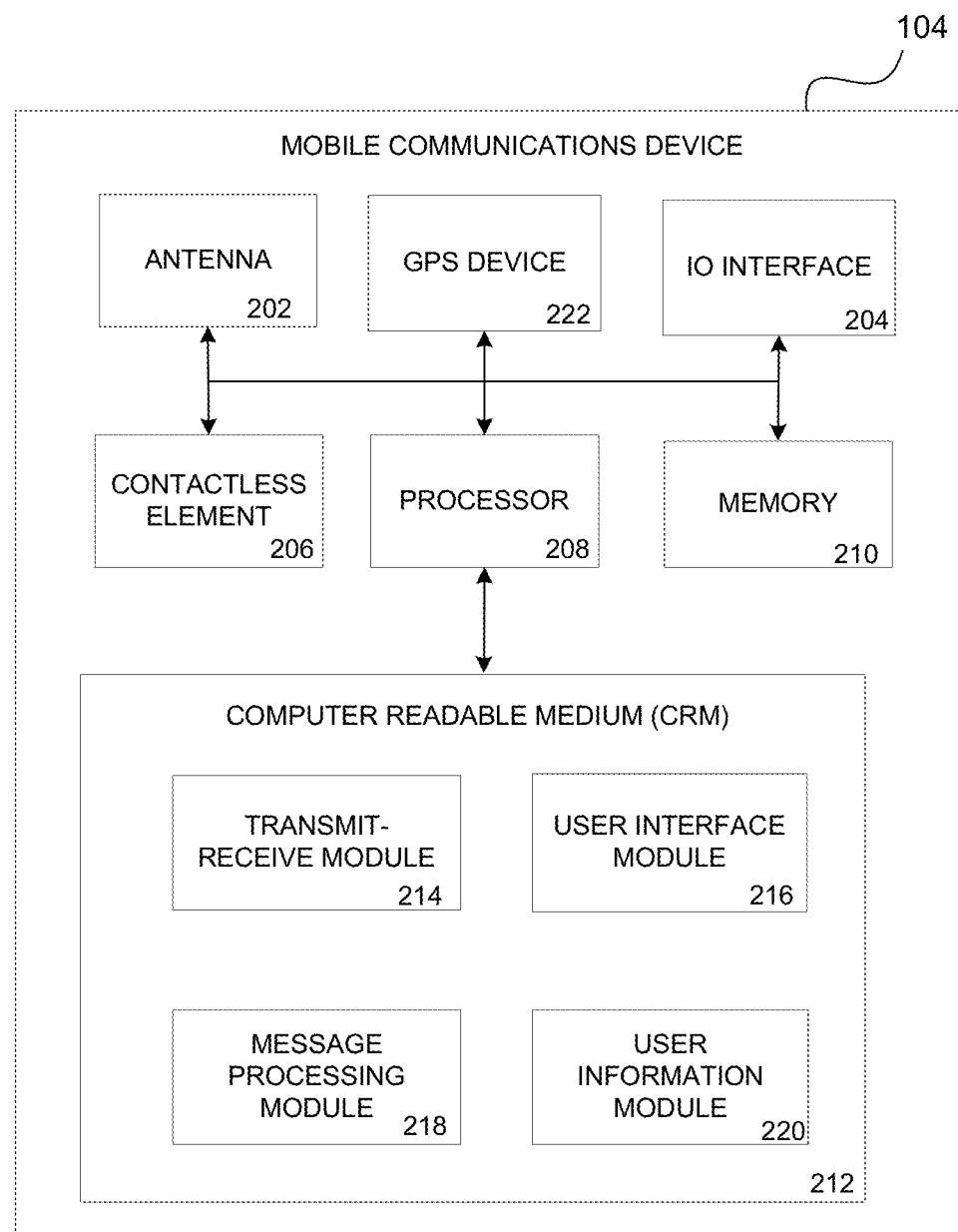
FIG. 2 illustrates certain elements of an exemplary mobile communications device that may be used to implement embodiments of the invention.

FIG. 2 illustrates certain elements of an exemplary mobile communications device that may be used to implement embodiments of the invention.

As discussed with reference to FIG. 1, the mobile communications device 104 may be configured to execute, display and/or provide the user 102 one or more applications relating to financial transactions. An antenna 202 may be used to transmit and receive signals, exchange data or other information with other entities, such as, the mobile communications network 106 or the access device 118. An 10 (input-output) interface 204 may be configured to interface with various entities such as keypad, display, mouse, track ball, touch screen, microphone, speaker, etc. A contactless element 206 may include a secure data storage element or a data transfer element. In some embodiments, user financial account information (e.g., Primary Account Number (PAN), payment tokens, Personal Identifier Number (PIN), etc.) may be stored on the contactless element 206. In some embodiments, information (e.g., name, account number, phone number, email, etc.) relating to the recipients associated with the user 102 may be stored on the contactless element 206. A memory 210 may be a non-volatile memory that can retain stored information when not powered, such as, Read Only Memory (ROM), Flash, or magnetic storage devices. A Global Positioning System (GPS) device 222 may be configured to determine the location of the mobile communications device 104 based on satellite ranging. In some embodiments, the location of the mobile communications device 104 may be determined based on cellular triangulation or using any location based service known in the art.

The mobile communications device 104 may include a processor 208 or processing elements that execute instructions or code in order to implement methods, processes or operations. The mobile communications device 104 may also include a Computer Readable Medium (CRM) 212 comprising code, executable by the processor 208 for implementing methods using embodiments of the invention. In some embodiments, the CRM 212 may comprise a mobile payment application for enabling the user 102 to conduct a financial transaction when a server computer unlocks an account associated with the user 102 for a certain period of time. In one embodiment, the mobile payment application may comprise a transmit-receive module 214, a user interface module 216, a message processing module 218 and a user information module 220 as part of the CRM 212.

The mobile payment application may be configured to enable the user 102 to select a type of transaction and an amount for the transaction using a payment menu. In some embodiments, the payment menu may be provided in response to the user 102 entering a shortcode (e.g., #575#) on the mobile communications device 104 (e.g., using a touch screen or keypad or speaking into a microphone). The mobile payment application may also be configured to communicate with a server computer that may be associated with the payment processing network 110 such that an account associated with the user 102 may be unlocked for a limited period of time to allow the user 102 perform a transaction using that account (e.g., withdraw cash). The user may be able to provide a passcode for authentication and also receive messages from the server computer relating to the account balance and whether the transaction is successful or aborted using the mobile application application. In some embodiments, the communication between the mobile application application 216 and the server computer may be performed using USSD protocol.

The transmit-receive module 214 may be configured to transmit and receive data and information between the mobile communications device 104 and other entities (e.g., payment processing network, access device, etc.). In some embodiments, the transmit-receive module 214 may comprise a decoder and an encoder for decoding and decrypting received data and for encrypting and encoding data for transmission in order to ensure secure communication with other entities. In some embodiments, the transmit-receive module 214 may be configured to perform data formatting for compatibility reasons.

The user interface module 216 may be configured to present a payment menu to the user 102 using the IO interface 204. For example, the payment menu may be presented on a display screen or on a speaker communicatively coupled to the 10 interface 204. The user interface module 216 may also be configured to receive and process user input from the payment menu via the IO interface 204, for example, entries on a keypad, touchscreen or spoken into a microphone communicatively coupled to the IO interface 204. Using the payment menu, the user 102 may select a type of transaction and an amount for the transaction. In some embodiments, the payment menu may be presented in response to a shortcode provided by the user 102 using a keypad, touchscreen or microphone associated with the mobile communications device 104.

The message processing module 218 may be configured to generate a request message to unlock an account associated with the user 102 when the user 102 initiates a transaction using the payment menu. The request message may be properly formatted and transmitted by the transmit-receive module 220 to the payment processing network 110. The message processing module 218 may also be configured to receive and process messages from the payment processing network 110 via the transmit-receive module 220. For example, the message processing module 218 may receive a notification message when the account is unlocked and a confirmation message when the transaction is complete. The message processing module 218 may also receive a request for a passcode to authenticate the user before the account is unlocked. The message processing module 218 may process the received messages and generate output messages comprising the received messages for the user 102 that may be presented on a display screen or to a speaker through the user interface module 216.

In some embodiments, the user may be validated based on the user information stored on the mobile communications device 104. For example, the user's passcode or any other relevant information (e.g., account numbers, personal information, PIN, etc.) may be stored on the memory 210 that may be accessed by the user information module 220 to authenticate or validate the user 102. For example, when the user 102 provides a passcode in response to a request received from the payment processing network 110, the passcode provided by the user 102 may be received by the user interface module 216 and processed by the user information module 220 to determine if the passcode matches with the passcode previously stored in the contactless element 206. If the passcode does not match, the user interface module 216 may transmit an error message to the payment processing network 110 informing that the user was not authenticated. In one embodiment, the user information module 220 may also be configured to access a list of recipients and their contact information associated with the user 102 stored in the memory 210 for performing money transfer transactions. In some embodiments, the user information and the recipients information is stored on the mobile communications device 104 when the user 102 registers for a mobile pre-paid service.

Figure 3:
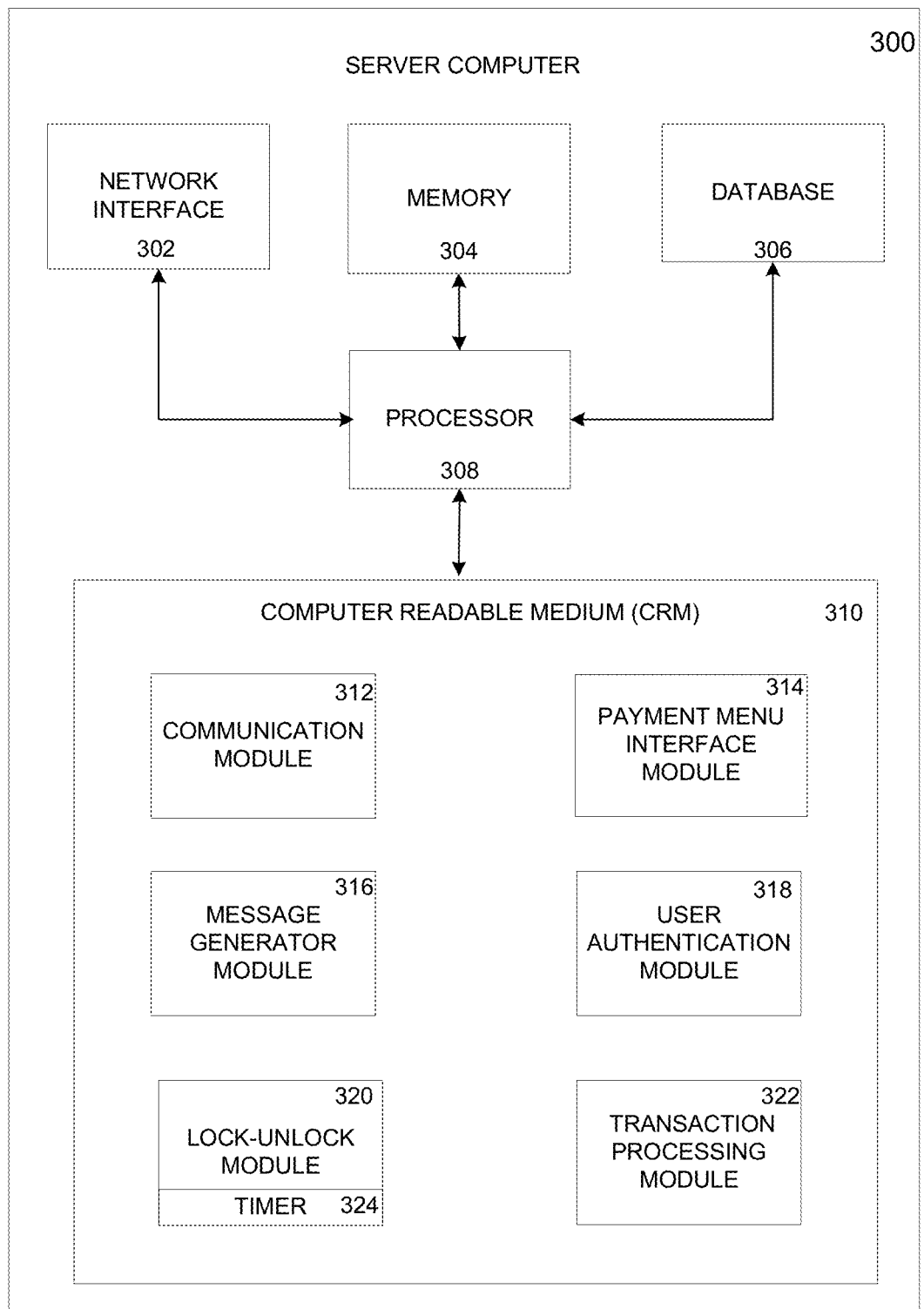
FIG. 3 illustrates certain elements of an exemplary server computer for implementing one or more embodiments of the invention.

FIG. 3 illustrates certain elements of an exemplary server computer for implementing one or more embodiments of the invention.

A server computer 300 may be part of the payment processing network 110, the issuer computer 116 or a third party. The server computer 300 may include a processor 308 or processing elements that execute instructions or code in order to implement methods, processes or operations. The server computer 300 may also include a CRM 310 comprising code, executable by the processor 308 for implementing a method using embodiments of the invention. In one embodiment, the CRM 310 may include a communication module 312, a payment menu interface module 314, a message generator module 316, a user authentication module 318, a lock-unlock module 320, and a transaction processing module 322.

A network interface 302 may be configured to interface with other entities on the network, for example, the mobile gateway 108, the acquirer computer 112, the issuer computer 116, and such. In some embodiments, the network interface 302 may be configured to support different networks associated with different entities. For example, the payment processing network 110 may communicate with the issuer computer 116 using one type of network (e.g., IP network) and with the mobile communications device 104 using another type of network (e.g., cellular network).

A memory 304 may be coupled to the processor 308 and may be a non-volatile memory that can retain stored information when not powered, such as, Read Only Memory (ROM), Flash, or magnetic storage devices. In some embodiments, the processor 308 may also be communicatively coupled to an external memory, e.g., hosted on a cloud server.

The server computer 300 may be configured to receive a request to unlock an account associated with the user 102 for conducting a transaction associated with the account. Some non-limiting examples of transactions include purchase transactions using the access device 118 or an online transaction using the client computer 120, a cash withdrawal transaction at the agent 126 or at the ATM 128, a money transfer transaction to a recipient 132. The information related to user's account, such as, account numbers, passwords, account balance, user personal information, etc., and also the recipients may be stored in a database 306 that may be communicatively coupled to the processor 308. In some embodiments, the access to the accounts may be locked by default unless an authenticated request to unlock the account is received. Also, the database 306 may also temporarily store the unlock amount received from a user's mobile communications device.

The communication module 312 may be configured to transmit and receive data and information for communicating with other modules or entities. For examples, the communication module 312 may transmit to and receive messages from the mobile communications device 104. In some embodiments the messages received from external entities may have been encoded and encrypted for secure communication. The communication module 312 may decode and decrypt the message to determine whether the message is for a request to unlock an account, a type of transaction, an amount for the transaction, a passcode for authentication or any such message transmitted from the mobile communications device 104. In some embodiments, the communication module 312 may also be configured to format, encode and encrypt the messages transmitted to other entities, such as, the mobile communications device 104 and/or the issuer computer 116. The messages for transmitting to other entities may be generated by the message generator module 316.

The payment menu interface module 314 may be configured to present a payment menu on the mobile communications device 104 associated with the user 102. In some embodiments, the payment menu interface may be based on a USSD protocol to establish a real-time session with the mobile communications device 104. The payment menu interface module 314 may provide options to the user 102 for initiating a transaction, selecting a type of transaction, an amount for the transaction, etc. In some embodiments, the payment menu may be presented to the mobile communications device 104 in response to receiving a certain short-code from the mobile communications device 104.

The message generator module 316 may be configured to generate messages that may be transmitted to external entities via the communication module 312. For example, the message generator module 316 may generate a notification message that an account associated with the user 102 is unlocked for a limited period of time. The notification message may be generated in response to a request to unlock the account for conducting a transaction. The notification message may also include the account balance and how long the account may be unlocked. If the transaction involves withdrawing money from an ATM, the notification message may also include an indication for finding an ATM to withdraw cash within certain time limit. In some embodiments, a list of nearest ATMs may be displayed based on the location of the mobile device that initiated the transaction request. In another example, the message generator module 316 may also generate a message for the user 102 requesting for a passcode to authenticate the user 102 before an account associated with the user may be unlocked. In some embodiments, the message generator module 316 may also generate a message for a recipient (e.g., recipient 132) when a money transfer transaction to the recipient is completed by the user 102.

The user authentication module 318 may be configured to authenticate the user before processing the request to unlock the account. In one embodiment, when the communication module 312 receives a request to unlock an account for a type of transaction, the message generator module 316 may generate a message requesting the user 102 to provide a passcode for authentication. The user 102 may provide a passcode using the mobile communications device 104 that may be received using the payment menu interface module 314. The user authentication module 318 may retrieve the previously stored passcode and any other relevant authentication information associated with the user 102 from the database 306 and compare to validate whether the user is an authorized user of the account. If the passcode is not verified, the payment menu interface module 314 may output an error message and send another request to enter the passcode or close the current session and go back to the main menu. If the passcode is verified, the account may be unlocked by the lock-unlock module 320.

The lock-unlock module 320 may be configured to keep the accounts associated with the registered users locked, i.e., funds associated with the accounts may not be accessed for conducting transactions, unless there is an authenticated request to access the account for a transaction. If the request to unlock an account has been authenticated by the user authentication module 318, the lock-unlock module may unlock the account for a limited period of time. The lock-unlock module 320 may contain code for denying authorization requests when the account to be accessed is in a locked state. It may also contain code for authorizing or passing on authorization requests to an issuer when the account is in an unlocked state and when the authorization request is for an amount that is less then the user specified unlock amount. The lock and/or unlocked state of a particular account may be designed in any suitable manner. For instance, a flag which has a state of "0" may indicate that the account is unlocked. A state of "1" may indicate that the account is in a locked state.

In some embodiments, the limited period of time may be determined based on a timer 324. The timer 324 may be an electronic counter of certain length. The timer 324 may be pre-set or updated based on user requirement (i.e., configured in mobile payment application) or by an authorized entity, such as, the payment processing network 110 or the issuer computer 116. In some embodiments, an unlock message may be sent to the issuer computer 116 for unlocking the associated account maintained by the issuer computer 116. For example, for withdrawing cash from the ATM 128, the issuer computer 116 unlocks the account associated with the user's ATM card or payment token to allow the user 102 access to the funds in that account.

The transaction processing module 322 may be configured to process the transaction once the account is unlocked and the user 102 initiates a transaction. The transaction processing module 322 may receive an authorization request message from the merchant computer 114 via the communication module 312. The transaction processing module 322 may process the authorization request message and forward it to the issuer computer 116 for authorization. After the issuer computer 116 authorizes the transaction, the transaction processing module 322 may receive an authorization response message from the issuer computer 116 that may be forwarded to the merchant computer 114 via the acquirer computer 112 for completing the transaction. In some embodiments, the timer 324 may be programmed with a suitable value so that the account stays unlocked until the transaction is complete. Once the transaction is complete, the message generator module 316 may generate a confirmation message for the user 102 that may be output on the mobile communications device 104 via the user interface module 216.

If the transaction selected by the user 102 involved sending money to the recipient 132, the payment menu interface module 314 may receive information related to the recipient 132 provided by the user 102. The recipient account information may be retrieved from the database 306 and provided to the issuer computer 116 for the issuer computer 116 to transfer money to an account associated with the recipient 132. The message generator module 316 may also generate a message for the recipient 132 indicating the money transfer that may be transmitted to the recipient device 134.

A method implementing embodiments of the invention and exemplary screen shots will be discussed with reference to FIGS. 4 and 5A-5H.

Figure 4:
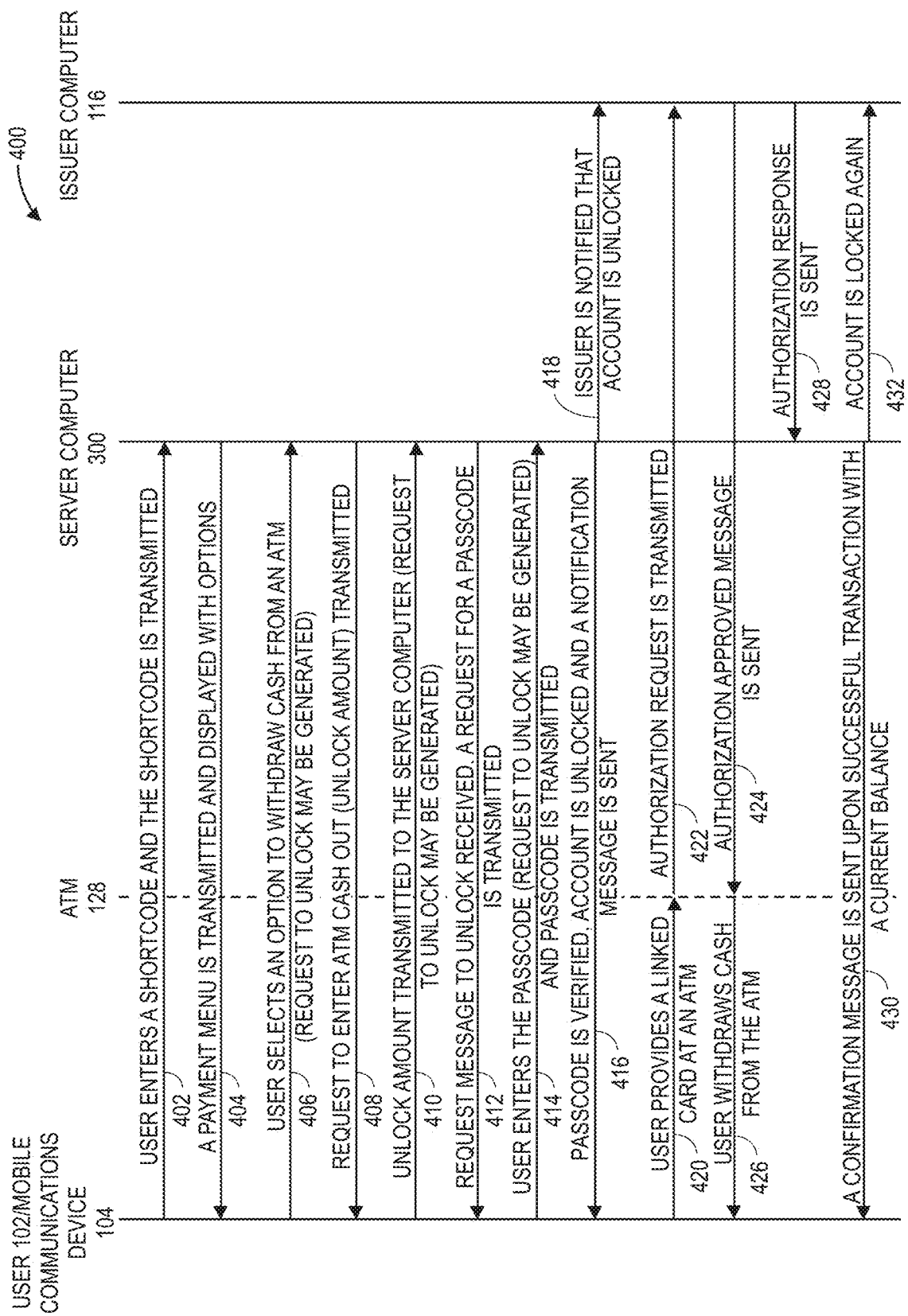
FIG. 4 illustrates a process flow diagram implementing a method for unlocking an account for withdrawing cash, in one embodiment of the invention.

FIG. 4 illustrates a process flow diagram implementing a method in one embodiment of the invention.

In step 402, the user 102 enters a shortcode on the mobile communications device 104 to launch a payment application for conducting a transaction, and the shortcode is transmitted to the server computer 300 in the payment processing network 110. In one embodiment, the user 102 may enter the shortcode (e.g., #575#) using a keypad associated with the mobile communications device 104. The shortcode may be processed by the user interface module 216 and transmitted to the server computer 300 by the transmit-receive module 214 indicating that a particular application associated with the shortcode (e.g., a mobile payment application) needs to be launched on the mobile communications device 104. As illustrated in FIG. 5A, a screen shot 502 displays a shortcode 518 (e.g., #575#) on a device screen (e.g., a screen associated with the mobile communications device 104). A reply button 520 on the device screen may be selected by the user 102 to send a message to the server computer 300. An exit button 522 may be selected by the user 102 to exit out of the application.

In response to receiving the shortcode from the mobile communications device 104, the server computer 300 may launch a USSD service to initiate a realtime session with the mobile communications device 104. In some embodiments, the USSD service may be associated with a mobile prepaid service in which the user 102 is registered. During the registration process, an account number (for a prepaid, credit, or debit account or device such as a card) associated with an issuer may be associated with a phone number, such that the server computer 300 can determine the account number from the phone number. As illustrated in an exemplary screen shot 504 in FIG. 5B, a welcome screen 524 may be displayed on the mobile communications device 104 indicating start of the prepaid service. In some embodiments, registering for the pre-paid service may involve associating a user's account and personal information and recipients information with the mobile communications device 104.

In step 404, a payment menu is transmitted from the server computer 300 to the mobile communications device 104 and is displayed on the mobile communications device 104 for the user 102 to make a selection. For example, the payment interface module 314 may launch a USSD menu on the mobile communications device 104 if the user 102 is registered with the prepaid service. As illustrated in an exemplary screen shot 506 in FIG. 5C, a payment menu 526 provides a list of options to choose from. For example, the user 102 may choose to cash out (option 1), send money (option 2), make payment (option 3), pay bills (option 4), top-up (option 5) or view account options (option 6). In some embodiments, when the user 102 makes a selection, a sub-list related to that option may be displayed to further narrow down the option. Note that the exemplary screen shot 506 illustrates that the user 102 may reply with a number from the list, however, it is understood that any suitable method of reply is acceptable, e.g., by keying in the number, by touching the option on a touch screen associated with the device using a finger or a stylus or by speaking the option in a microphone associated with the mobile communications device 104.

In step 406, the user 102 makes a selection for a type of transaction from the payment menu 526 and this selection is transmitted from the mobile communications device 104 to the server computer 300. For example, to withdraw cash, the user 102 may select option 1 (cash out) on the payment menu 526. In one embodiment of the invention, selecting a transaction option may generate a request to unlock an account. As discussed, embodiments enable the user to specify an unlock amount corresponding to a maximum amount of cash that can be withdrawn while the account is unlocked. As illustrated in an exemplary screen shot 508 in FIG. 5D, selecting option 1 to withdraw cash may further present a sub-list 528 to the user 102 to select whether the cash out will be from an ATM (option 1) or from an agent (option 2). The user 102 may select option 1 to withdraw cash from an ATM, e.g., the ATM 128.

In step 408, the server computer 300 transmits a request message to the mobile communications device 104 for an ATM cash out amount. The user interface module 216 may output the current balance on the device screen and the user 102 may be prompted to enter an unlock amount for the transaction. As illustrated in a screen shot 510 in FIG. 5E, when the user 102 selects an option to withdraw cash from the ATM 128, a current balance 530 of $681.04 is displayed on the screen and the user 102 is prompted to enter the ATM cash out amount 532. The cash out amount 532 may be the unlock amount. The user 102 may withdraw an amount equal to or less than the unlock amount from the ATM 128.

In step 410, in response to entering an amount for withdrawing cash by the user 102, the mobile communications device 104 transmits the unlock amount to the server computer 300.

In step 412, in response to receiving a request message to unlock an account associated with the user 102, the server computer 300 in the payment processing network 110 transmits a request message to the mobile communications device 104 operated by the user 102 to provide a passcode to confirm the transaction. As illustrated in a screen shot 512 in FIG. 5F, for the ATM cash out amount 534 (or unlock amount in this case), the user 102 is prompted to reply with a passcode 536 to confirm the transaction.

In step 414, the user 102 enters a passcode into the mobile communications device 104 when prompted, and the request to unlock the account may be transmitted by the mobile communication device 104 to the server computer 300. In one embodiment of the invention, providing a passcode may generate a request to unlock an account by the message processing module 218. The passcode may be of certain length and may be a combination of digits and/or alphanumeric characters. The passcode may have been setup by the user while registering for the prepaid service.

The server computer 300 verifies the passcode and unlocks the account for a certain duration if the passcode is verified. In some embodiments, for verifying the passcode, the user authentication module 318 may compare the passcode provided by the user 102 with a passcode associated with the user 102 retrieved from the database 306 storing relevant information relating to the users accounts registered in the prepaid service. If the passcode is verified, the lock-unlock module 320 may unlock the account associated with the user 102 for a duration of time based on the timer 324.

In step 416, the message generator module 316 may generate a notification message indicating to the user 102 that the account is unlocked. The message processing module 218 may process the notification message and generate an output message comprising the received message that may be presented on a display screen or to a speaker through the user interface module 216. If the passcode does not match then an error message may be generated by the message generator module 316. In some embodiments, the user may be prompted again to enter the passcode. In some other embodiments, the current transaction may be aborted and the home screen may be displayed for the user 102 to make another selection. The user 102 may proceed with the transaction after receiving the notification that the account is unlocked As illustrated in a screen shot 514 in FIG. 5G, a message 538 that the account is unlocked is displayed on the device screen. In some embodiments, current balance 540 may also be displayed on the device screen. A clock 546 may be displayed to indicate current time. A time 542 until the unlock is valid (e.g., time+10) may also be displayed. If the transaction was to withdraw cash from the ATM, a message 544 to go to an ATM within 10 minutes to withdraw cash may be displayed. The user may walk up to the nearest ATM and withdraw cash using a card linked to the unlocked account and by entering a PIN. In some embodiments, a list of nearest ATMs may be provided based on the location of the mobile communications device 104 that may be determined based on a known location based service, i.e., GPS, cellular triangulation, etc.

In step 418, the server computer 300 may notify the issuer computer 116 that the account associated with the user 102 is unlocked so the issuer computer 116 may release the funds associated with the account. In some embodiments, only the transaction amount entered by the user 102 is unlocked, i.e., accessible for the transaction.

In step 420, the user 102 provides a payment card or a token and a PIN to the ATM 128. The payment card/token may be linked to the unlocked account so that the user 102 has access to the funds associated with the account for a limited period of time. In other embodiments, only the PIN may be needed (i.e., the payment card is not needed).

In step 422, an authorization request may be transmitted to the issuer computer 116 in order to complete the cash withdrawal transaction. In some embodiments, the authorization request may be received by the payment processing network 110, which forwards it to the issuer computer 116.

In step 424, the issuer computer 116 may approve the authorization for the cash withdrawal and transmit an authorization response message comprising an approval indicator to the ATM 128.

In embodiments of the invention, an "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account and a secret token provided by a consumer. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, ATM identifier, ATM location, etc., as well as any other information that may be utilized in determining whether to identify and/or authorize a transaction.

An "authorization response message" may be an electronic message reply to an authorization request message generated by an account issuer, payment processing network, mobile payment processor, or a mobile network operator. The authorization response message may include, by way of example only, one or more of the following status indicators: Approval—transaction was approved; Decline—transaction was not approved; or Call Center—response pending more information, may call the toll-free authorization phone number. The authorization response message may also include an authorization code, which may be a code that an issuing bank or other entity (e.g. a mobile network operator or mobile payment processor) returns in response to an authorization request message in an electronic message (either directly or through the payment processing network) to the transaction apparatus (e.g. an ATM) that indicates approval of the transaction and completes the transaction. The code may serve as proof of authorization.

In step 426, the user 102 may be able to withdraw cash from the ATM 128. In some embodiments, the user 102 may be able to withdraw only the authorized unlock amount, e.g., the amount 532 entered by the user 102 in FIG. 5E. In other embodiments, the user 102 may be able to withdraw less than the unlock amount, but not more than the unlock amount.

In step 428, the issuer computer 116 may transmit an authorization response to the payment processing network 110. In some embodiments, the steps 422 and 424 may be the same or may overlap.

In step 430, a confirmation message may be sent to the mobile communications device 104 indicating that the transaction was successful. The message processing module 218 may process the confirmation message and generate an output message comprising the confirmation message that may be presented on a display screen or to a speaker through the user interface module 216. As illustrated in a screen shot 516 in FIG. 5H, a message 548 indicating that the ATM cash out was successful may be received by the mobile communications device 104. A reference number 550 may be provided that may be used to track this particular transaction if needed. An amount 552 may indicate the transaction amount, e.g., the cash amount. A balance 554 may indicate the balance for the account after the cash withdrawal. A date and time indicator 556 may display the date and time of the transaction.

In step 432, the server computer 300 may lock the account using the lock-unlock module 320 once the transaction is complete and communicate to the issuer computer 116 using the communications module 312 that the account is locked. In one embodiment, the user 102 may need to launch the payment menu again to initiate another transaction. In another embodiment, the home screen on the mobile communications device 104 may present an option to the user for conducting another transaction before locking the account. If the user 102 decides to conduct another transaction by selecting an option from the payment menu 526, the timer 324 may be reset/updated for allowing a new time period for which the account stays unlocked. In some embodiments, the number of transactions that may be conducted while keeping the account unlocked may be pre-determined by the issuer or the user.

Figure 6:
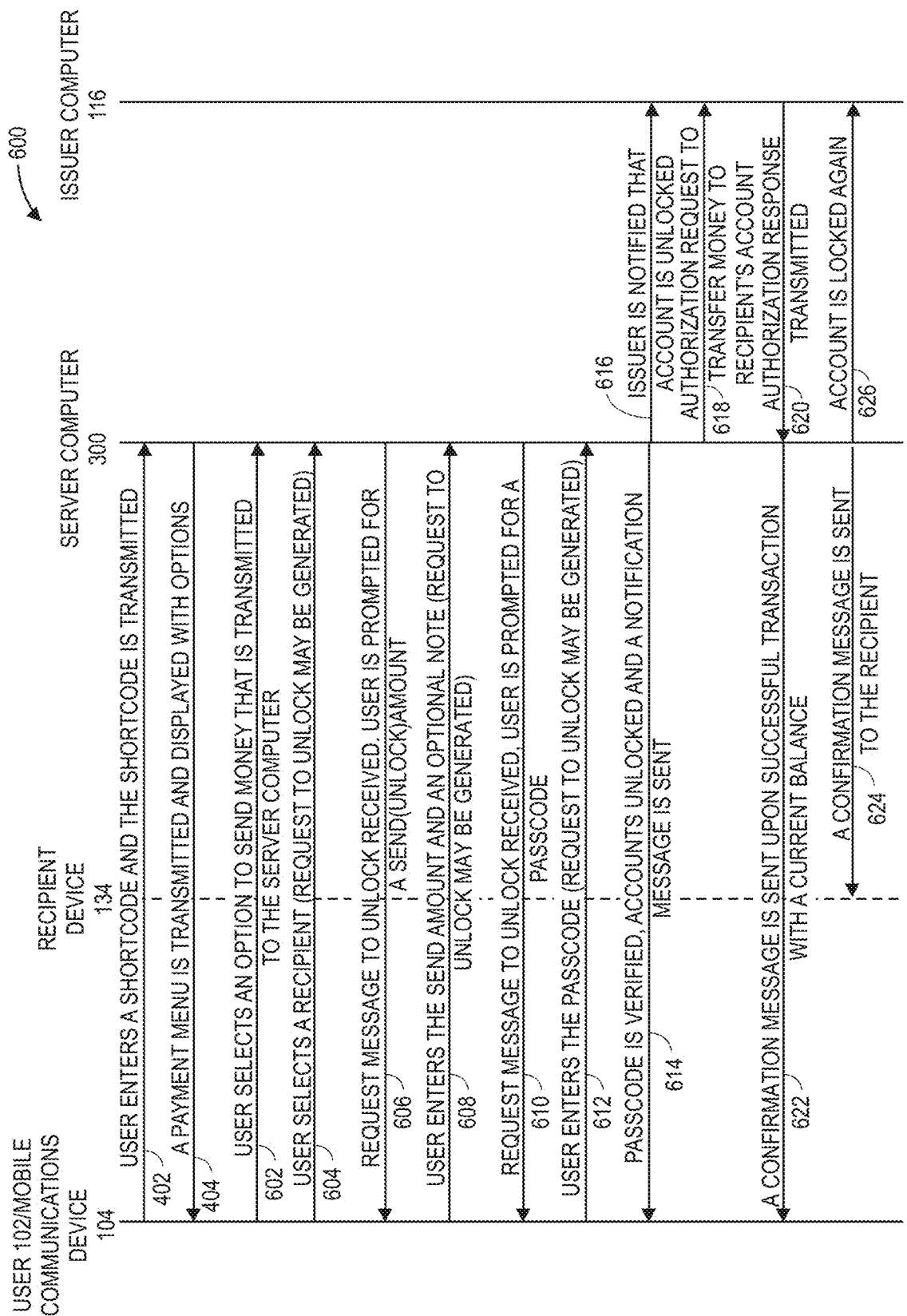
FIG. 6 illustrates a process flow diagram implementing a method for unlocking an account for sending money, in one embodiment of the invention.

FIG. 6 illustrates a process flow diagram implementing a method for unlocking an account for sending money in one embodiment of the invention. Exemplary screen shots for this method are illustrated in FIGS. 7A-7F.

Referring back to FIG. 6, the user 102 may enter a short code (step 402) to launch a mobile payment application on the mobile communications device 104 and this short code may be transmitted to the server computer 300 in the payment processing network 110. A payment menu may be displayed, by the mobile communications device 104 to the user 102 with options (step 404).

In step 602, the user 102 may select an option to send money, and this is transmitted to the server computer 300. For example, the user may select option 2 (send) on the payment menu 526 in FIG. 5C. In response to selecting the option to send money, a list of recipients may be displayed on the mobile communications device 104, as shown in a screen shot 702 in FIG. 7A.

In step 604, the user 102 may select a recipient from the list of recipients, and this selection is transmitted from the mobile communications device 104 to the server computer 300 in the payment processing network 110. As illustrated in the screen shot 702, a list of recipients 714 is presented for send money option. The user 102 may choose any of the options 1 to 4 from the list 714 to select a recipient. In one embodiment, selecting option 5 may display a "feature unavailable" message. In some other embodiments, the user 102 may be able to add a recipient to the list 714 by selecting option 5. The user may select option "00" to return to the home screen. Each recipient in the list may be associated with an identifier which may be an account number (e.g., credit or debit card number), a phone number, or any other suitable identification. In one embodiment, the recipient information may be stored with the user information in a database, e.g., database 306. In some embodiments, the recipient information may also include contact information for each recipient, such as, email address, phone number, billing address, etc. In some embodiments, the recipient information may be stored on the mobile communication device 104, e.g., on the contactless element 206. The message processing module 218 may generate a request to unlock an account associated with the user 102 once a recipient has been selected by the user 102.

In step 606, the server computer 300 may receive a request message to unlock the account for money transfer. The request message may be decoded by the communication module 312 and forwarded to the message generator module 316 so that a message with current balance may be generated that may be presented to the user 102 using the payment menu interface module 314. The message may also include a request for the user to provide an amount for the money transfer. This may be equal to the unlock amount. As illustrated in a screen shot 704 in FIG. 7B, the user interface module 216 may provide a current balance 716 and prompt the user 102 to enter a send amount 718.

In step 608, the user 102 enters the send amount, and this may be transmitted from the mobile communications device 104 to the server computer 300. As illustrated in a screen shot 706 in FIG. 7C, the user 102 may be prompted to enter a description or a note 720 for the recipient. As an example, the description may be a reference description or may be a note up to certain length for the recipient. In one embodiment, the user may leave the description blank. In some embodiments, if the amount 718 entered by the user 102 is more than the current balance 716, an error message may be displayed and the user 102 may be prompted again or the home screen may be displayed.

Figures 7C, 7D:
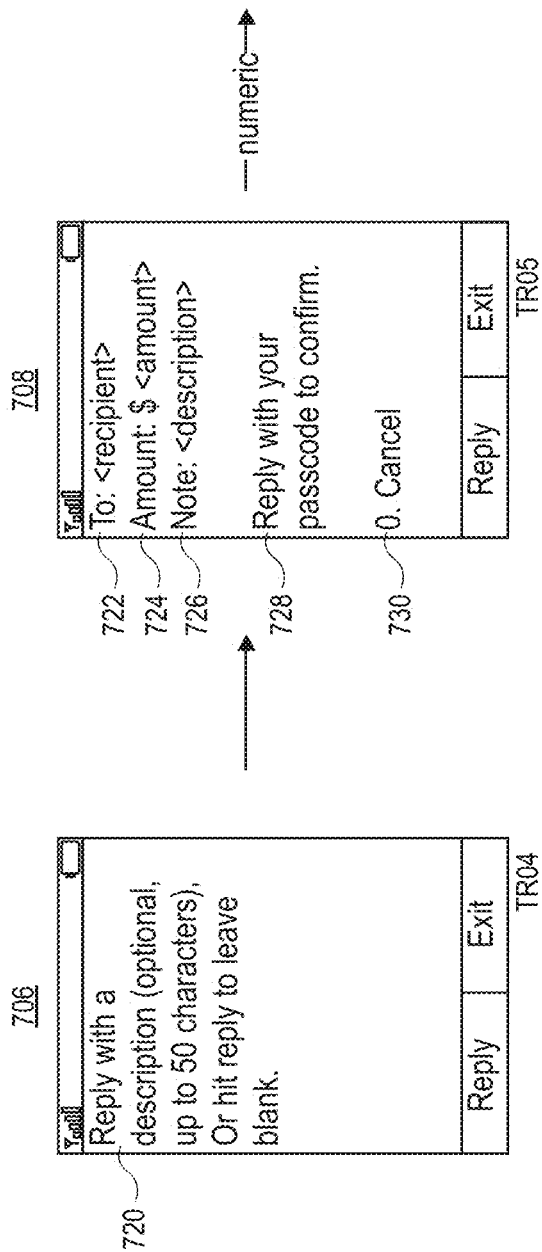

In step 610, the server computer 300 may receive a request message to unlock the account for money transfer if the request was not received in step 606. As illustrated in FIG. 7D, a screen shot 708 may include a recipient 722, an amount 724, a note 726, a prompt 728 for the passcode and option 730 to cancel the money transfer request. The note 726 may be the note provided by the user 102 in FIG. 7C.

In step 612, the user 102 may provide a passcode when prompted for authentication. The user authentication module 318 may verify the passcode as discussed previously with reference to FIG. 4.

In step 614, the passcode is verified by the server computer 300. The lock-unlock module 320 may unlock the account associated with the user 102 for a duration of time based on the timer 324. The message generator module 316 may generate a notification message indicating the user 102 that the send request is being processed. The message processing module 218 may process the notification message and generate an output message comprising the received message that may be presented on a display screen or to a speaker through the user interface module 216. As illustrated in a screen shot 710 in FIG. 7E, a notification message 732 is presented to the user 102. The user 102 may select an option 734 to return to the main menu.

In step 616, the server computer 300 notifies the issue computer 116 that an account associated with the user 102 is unlocked for a certain duration of the time.

In step 618, the server computer 300 may transmit an authorization request to the issuer computer 116 for transferring money to the recipient's account. In some embodiments, the steps 616 and 618 are combined. The authorization request may include the account information of the recipient to which the money should be transferred.

In step 620, the issuer computer 116 may transmit an authorization response to the server computer 300 relating to the money transfer. The authorization response may include whether the authorization was approved or rejected.

In step 622, if the authorization was approved, the server computer 300 may send a confirmation message to the user 102. The message generator module 316 may generate a confirmation message indicating the user 102 that the account is unlocked. The message processing module 218 may process the confirmation message and generate an output message comprising the confirmation message that may be presented on a display screen or to a speaker through the user interface module 216. As illustrated in FIG. 7F, a screen shot 712 includes a confirmation message 736 indicating "send successful", a reference 738, the recipient 722, the amount 724 and a balance 744. The balance 744 may be the current balance 716 less the amount 724.

In step 624, a confirmation message is also sent to the recipient device 134 associated with the recipient 132 after the transaction is complete. The recipient contact information may be stored along with the user information in the database 306 and/or the memory 210.

In step 626, the server computer 300 may lock the account once the transaction is complete and communicate to the issuer computer 116 that the account is locked. The user 102 may need to launch the payment menu again to initiate another transaction.

Embodiments of the invention solve a technical problem of unauthorized access of financial accounts associated with users that result in financial losses and unproductive use of resources (human and computing resources) by providing a secure method of conducting transactions using a mobile payment application. Embodiments of the invention provide a technical effect by unlocking a financial account associated with an authenticated user for a limited period of time and for a specified amount in order to enable the user conduct a financial transaction using funds from that account. By allowing limited access to a user's account, embodiments of the invention provide benefits, such as, reduction in fraudulent transactions and improved account security. The mobile payment application provides a convenient and easy user interface for conducting transactions in a secure manner. In addition, allowing the transaction based on the successful verification of the passcode provided by the user adds an extra layer of security for both the user and the account issuer.

Figure 8:
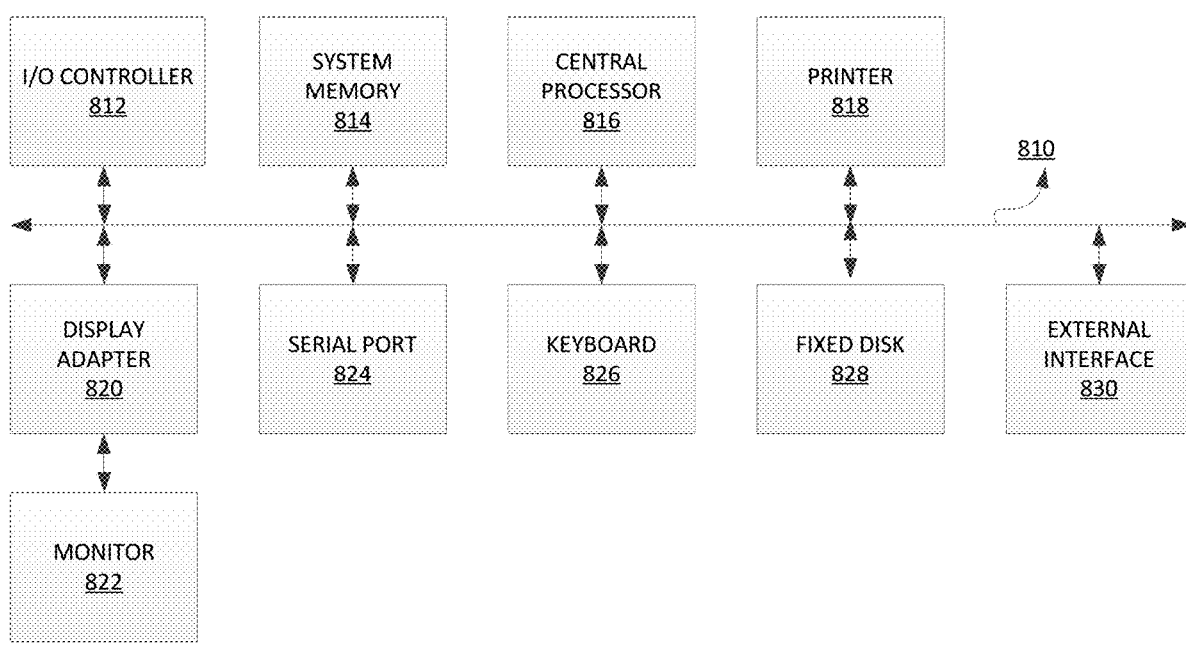
FIG. 8 shows a block diagram of an exemplary computer apparatus that may be used in some embodiments.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 8. The subsystems shown in FIG. 8 are interconnected via a system bus 810. Additional subsystems such as a printer 818, keyboard 826, fixed disk 828 (or other memory comprising computer readable media), monitor 822, which is coupled to display adapter 820, and others are shown. Peripherals and input/output (I/O) devices, which couple to I/O controller 812, can be connected to the computer system by any number of means known in the art, such as serial port 824. For example, serial port 824 or external interface 830 can be used to connect the computer apparatus to a wide area network such as the Internet, a mouse input device, or a scanner. The interconnection via system bus 810 allows the central processor 816 to communicate with each subsystem and to control the execution of instructions from system memory 814 or the fixed disk 828, as well as the exchange of information between subsystems. The system memory 814 and/or the fixed disk 828 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

One or more features from any embodiment may be combined with one or more features of any other embodiment without departing from the scope of the disclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
    receiving, at a server computer from a mobile communications device, a request message to unlock an account associated with a user for conducting two or more transactions on the account;
    transmitting, by the server computer to the mobile communications device, a request for a passcode, a total number of transactions, and an unlock amount;
    receiving, by the server computer from the mobile communications device, the passcode, the unlock amount, and the total number of transactions specified by the user;
    verifying, by the server computer, the passcode based on account information associated with the user stored in a database communicatively coupled to the server computer;
    unlocking, by the server computer, the account for a limited period of time, for the unlock amount, and for the total number of transactions, to allow conducting transactions using the account within the limited period of time and for the total number of transactions using a personal identification number (PIN), wherein a total amount associated with the transactions is less than or equal to the unlock amount;
    receiving a plurality of first authorization request messages, corresponding to a respective plurality of first transactions, comprising a respective plurality of first transaction amounts;
    determining, by a lock-unlock module in the server computer, that (a) a total of the first transaction amounts is less than the unlock amount and (b) that the limited period of time has not elapsed, based on a timer in the server computer;
    transmitting the plurality of first authorization request messages, corresponding to the respective plurality of first transactions, to an issuer of the account for approval;
    receiving a subsequent authorization request message comprising a subsequent transaction amount for a subsequent transaction;
    determining, by the lock-unlock module in the server computer, that a sum of the subsequent transaction amount and the total of the first transaction amounts exceeds the unlock amount; and
    transmitting an authorization response message declining the subsequent transaction.

2. The method of claim 1, further comprising:
    locking the account after the limited period of time expires.

3. The method of claim 1, further comprising:
    sending a message to the issuer associated with the account to notify unlocking of the account.

4. The method of claim 1, further comprising:
    transmitting, by the server computer, a notification message indicating that the account associated with the user is unlocked.

5. The method of claim 4, wherein the notification message comprises a current balance associated with the account.

6. The method of claim 1, wherein the transactions are conducted on the account using the mobile communications device.

7. The method of claim 1, wherein the transactions are conducted on the account using a payment card.

8. The method of claim 1, wherein the transactions are conducted on the account using a token.

9. The method of claim 1, wherein the method further comprises:
    obtaining a current location of the mobile communications device;
    generating a list of automated teller machines closest to the mobile communications device using the current location; and
    providing the list of automated teller machines to the mobile communications device.

10. The method of claim 1, wherein receiving the passcode by the server computer is in response to transmitting the request for the passcode.

11. The method of claim 1, wherein receiving the plurality of first authorization request messages comprises receiving the plurality of first authorization request messages from one or more access devices, automated teller machines, client computers, and/or agent mobile devices.

12. The method of claim 1, wherein the first authorization request messages, of the plurality of first authorization request messages, further comprise the personal identification number (PIN).

13. A server computer comprising a processor, and a non-transitory computer readable medium, the computer readable medium coupled to the processor and including encoded instructions executable by the processor for implementing a method comprising:
    receiving, at the server computer from a mobile communications device, a request message to unlock an account associated with a user for conducting two or more transactions on the account;
    transmitting, by the server computer to the mobile communications device, a request for a passcode, a total number of transactions, and an unlock amount;
    receiving, by the server computer from the mobile communications device, the passcode, the unlock amount, and the total number of transactions specified by the user;
    verifying, by the server computer, the passcode based on account information associated with the user stored in a database communicatively coupled to the server computer;
    unlocking, by the server computer, the account for a limited period of time, for the unlock amount, and for the total number of transactions, to allow conducting transactions using the account within the limited period of time and for the total number of transactions using a personal identification number (PIN), wherein a total amount associated with the transactions is less than or equal to the unlock amount;

receiving a plurality of first authorization request messages, corresponding to a respective plurality of first transactions, comprising a respective plurality of first transaction amounts;

determining, by a lock-unlock module in the server computer, that (a) a total of the first transaction amounts is less than the unlock amount and (b) that the limited period of time has not elapsed, based on a timer in the server computer;

transmitting the plurality of first authorization request messages, corresponding to the respective plurality of first transactions, to an issuer of the account for approval;

receiving a subsequent authorization request message comprising a subsequent transaction amount for a subsequent transaction;

determining, by the lock-unlock module in the server computer, that a sum of the subsequent transaction amount and the total of the first transaction amounts exceeds the unlock amount; and transmitting an authorization response message declining the subsequent transaction.

14. The server computer of claim 13, wherein the request message further includes a selected transaction type, from two or more types of transactions, to unlock.

15. The server computer of claim 14, wherein the selected transaction type includes an automated teller machine transaction, and wherein the method further comprises:
obtaining a current location of the mobile communications device;
generating a list of automated teller machines closest to the mobile communications device using the current location; and
providing the list of automated teller machines to the mobile communications device.

16. The server computer of claim 13, the method further comprising locking the account after the limited period of time expires.

17. A method comprising:
transmitting, to a server computer by a mobile communications device, a request message to unlock an account associated with a user for conducting two or more transactions on the account;
receiving, at the server computer from the mobile communications device, the request message to unlock the account associated with the user for conducting the two or more transactions on the account;
transmitting, by the server computer to the mobile communications device, a request for a passcode, a total number of transactions, and an unlock amount specified by the user;
transmitting, to the server computer, the passcode and the unlock amount specified by the user;
receiving, by the server computer from the mobile communications device, the passcode, the unlock amount, and the total number of transactions specified by the user;
verifying, by the server computer, the passcode based on account information associated with the user stored in a database communicatively coupled to the server computer;
unlocking, by the server computer, the account for a limited period of time, for the unlock amount, and for the total number of transactions, to allow conducting transactions using the account within the limited period of time and for the total number of transactions using a personal identification number (PIN), wherein a total amount associated with the transactions is less than or equal to the unlock amount;
receiving, by the mobile communications device from the server computer, a notification message at the mobile communications device indicating that the account associated with the user is unlocked;
generating, by the mobile communications device, an output message comprising the notification message; and
presenting, by the mobile communications device, the output message;
receiving, by the server computer, a plurality of first authorization request messages, corresponding to a respective plurality of first transactions, comprising a respective plurality of first transaction amounts;
determining, by a lock-unlock module in the server computer, that (a) a total of the first transaction amounts is less than the unlock amount and (b) that the limited period of time has not elapsed, based on a timer in the server computer;
transmitting, by the server computer, the plurality of first authorization request messages, corresponding to the respective plurality of first transactions, to an issuer of the account for approval;
receiving, by the server computer, a subsequent authorization request message comprising a subsequent transaction amount for a subsequent transaction;
determining, by the lock-unlock module in the server computer, that a sum of the subsequent transaction amount and the total of the first transaction amounts exceeds the unlock amount; and
transmitting, by the server computer, an authorization response message declining the subsequent transaction.

18. The method of claim 17, wherein a payment menu is provided at the mobile communications device with options relating to the two or more transactions.

19. The method of claim 18, wherein the request message is generated in response to selecting an option on the payment menu.

20. The method of claim 18, wherein the request message is generated in response to providing the passcode.

* * * * *